Dec. 28, 1965  J. A. SAMWEL  3,226,568
GATING MEANS FOR PASSING A PREDETERMINED
NUMBER OF PULSES
Filed March 16, 1962  3 Sheets-Sheet 1
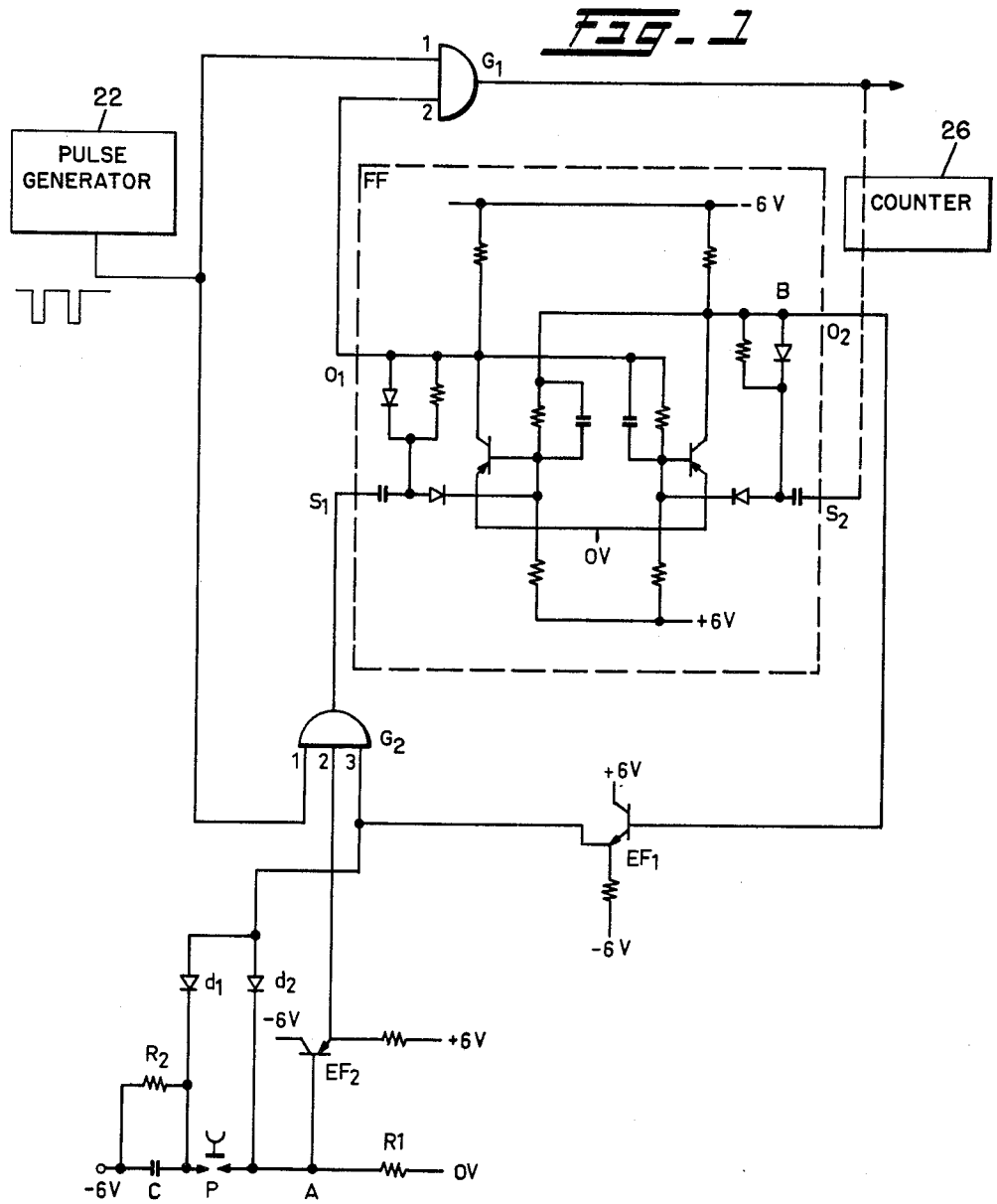

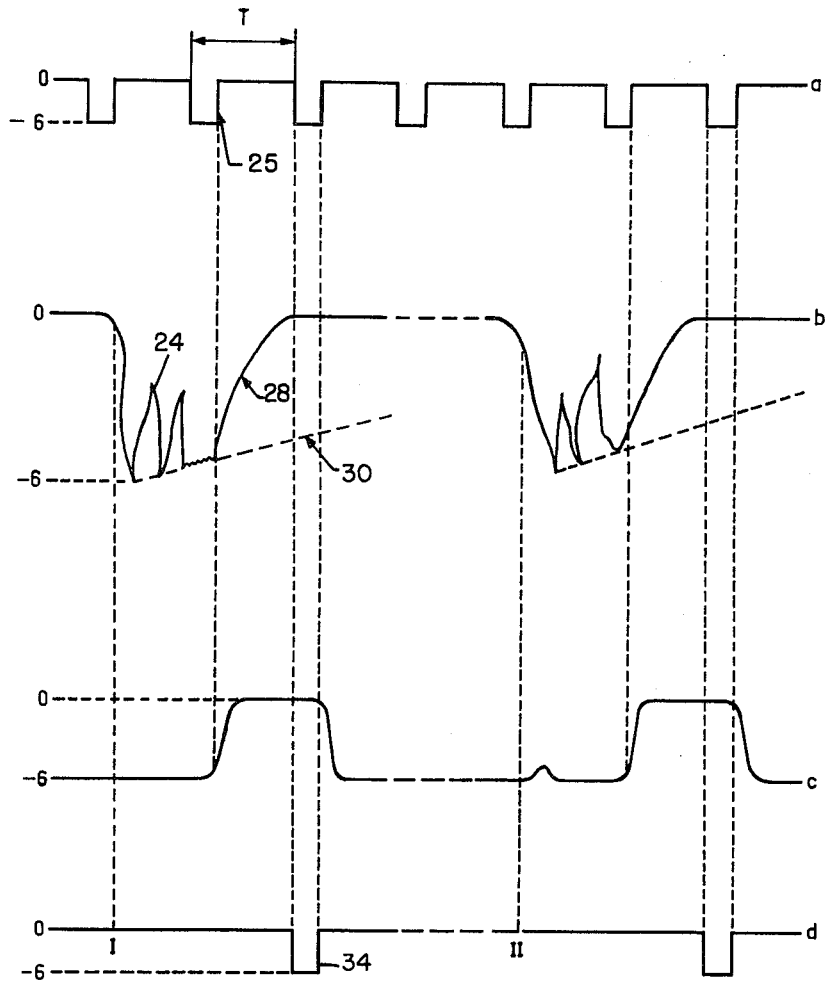

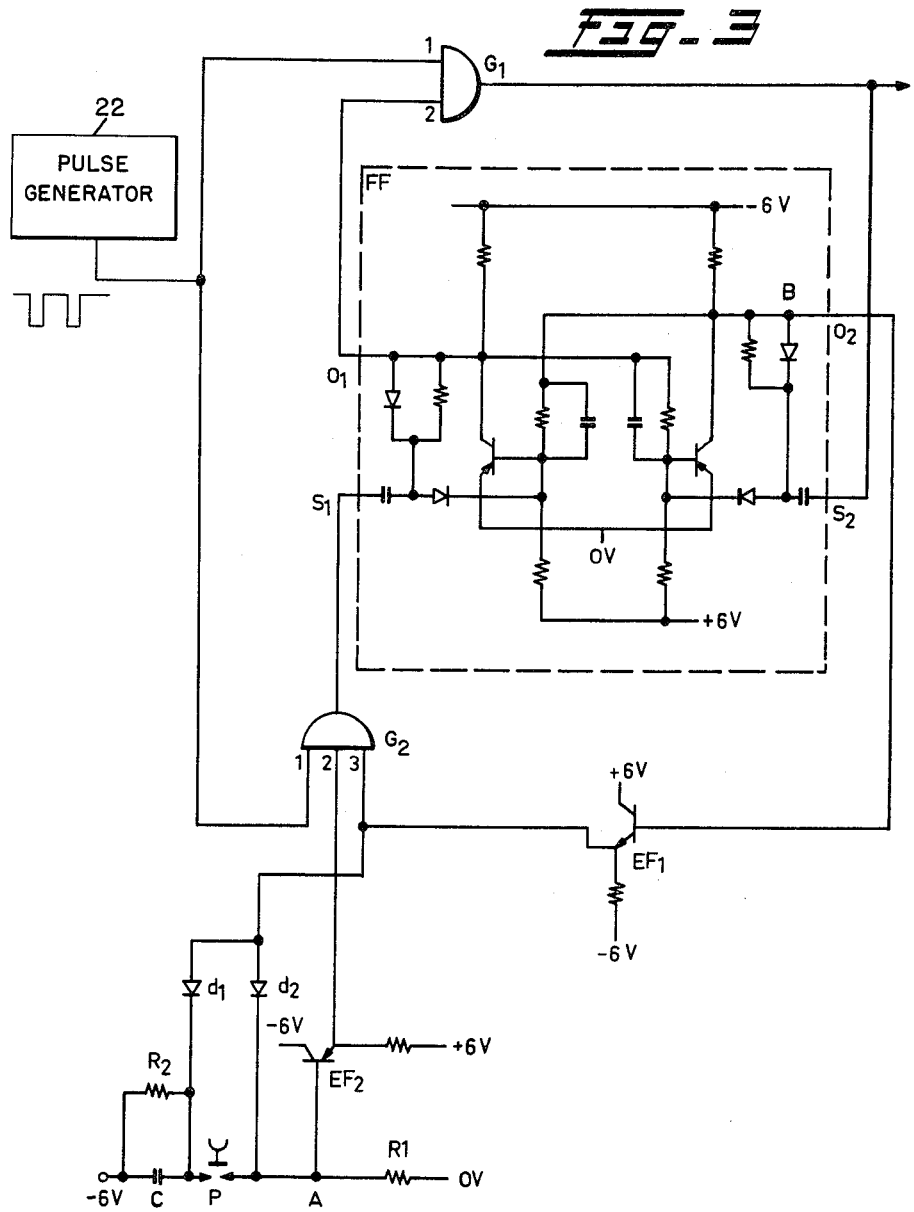

United States Patent Office 3,226,568
Patented Dec. 28, 1965

3,226,568
GATING MEANS FOR PASSING A PREDETERMINED NUMBER OF PULSES
Jan A. Samwel, Nijmegen, Netherlands, assignor, by mesne assignments, to Friden, Inc., San Leandro, Calif., a corporation of Delaware
Filed Mar. 16, 1962, Ser. No. 180,125
Claims priority, application Netherlands, Mar. 28, 1961, 262,910
6 Claims. (Cl. 307—88.5)

The invention relates to a device for producing a prescribed number of uniform pulses. Such a device is, for instance, used in testing electronic digital computers.

Thereby it is desired that by a manipulation as simple as possible, for instance, the depression of a button, a desired number of uniform pulses is applied to the machine to be tested. In a known device to this end, use is made of a generator which produces uniform pulses continuously. Said generator is connected to an input of an "and"-gate, while the other input of said "and"-gate is connected to a control circuit. As a rule said control circuit comprises a capacitor which is charged or discharged by the closing of a switch which is operated by the push button, so that a pulse is obtained which serves to enable said "and"-gate whereby the pulses from the generator are passed. In devices of the aforementioned type it is a problem to effect that, regardless the moment at which the push button is depressed, the moment at which the "and"-gate is enabled is located within the period between successive pulses from the generator. Moreover the force exerted on the movable contact of the push button switch is, as a result of the spring mechanism used therein, irregular as a function of the time, so that the moment at which said switch is actually closed is not definitely determined. In the book, "Logical Design of Digital Computers," Wiley, 1958, by Montgomery Phister, Jr., chapter 5, page 113, FIG. 5–1, a device is described by means of which the above mentioned difficulties are eliminated. However, in that device, use is made of two bistable triggers.

The object of the invention is to provide a device wherein the same object is attained by using only one bistable trigger.

To this end the device according to the invention is realized in such a manner that by operating said switch, the capacitor of an RC-circuit is charged in a circuit having a time constant which is large with respect to the pulse repetition time, while the trailing edge of the first complete pulse following the instant at which said switch was operated, switches said trigger, whereby the other input of said "and"-gate circuit is made conductive and said capacitor is charged in a circuit having a time constant which is small with respect to said pulse repetition time, while the trailing edge of the last pulse of the prescribed number of pulses returns said trigger to its initial condition, whereby said second input of said "and"-gate circuit is set into its blocking condition.

Further, the device according to the invention can be realized in such a manner that said trigger is provided with a first output which is connected to said second input of said "and"-gate circuit, with a second output which is connected to a third input of a second "and"-gate circuit through a low ohmic impedance, said third input being further connected to the junction point between said capacitor and a resistance which has such a value that the RC-time is relatively large with respect to the pulse repetition time, with a first input which is connected to the output of said second "and"-gate circuit and with a second input which is coupled to the output of the first said "and"-gate circuit.

Further the device according to the invention can be realized in such a manner that the output of the first "and"-gate circuit is connected to the input of a counter, the output of which is connected to the second input of the trigger.

If, upon the depression of the button, only one pulse must be supplied, the device according to the invention can be realized in such a manner that the output of said first "and"-gate circuit is directly connected to said second input of said trigger.

The invention will be further described with reference to the drawings wherein:

FIG. 1 is a basic diagram of an embodiment according to the invention.

FIG. 2 shows a number of voltage-time curves by means of which the operation of the embodiment according to FIG. 1 will be described. And, FIG. 3 is a diagram similar to FIG. 1, showing an alternative embodiment of the invention.

In the device according to FIG. 1 a generator 22 for continuously producing uniform pulses is connected to a first input 1 of a first "and"-gate circuit $G_1$ and to a first input 1 of a second "and"-gate circuit $G_2$. The output of said gate circuit $G_2$ is connected to a first input $S_1$ of a bistable trigger FF. A first output $O_1$ of said trigger FF is connected to a second input 2 of the gate circuit $G_1$. A second output $O_2$ of said trigger is connected to a third input 3 of the second gate circuit $G_2$ through a transistor $EF_1$ connected as an emitter follower. Moreover said third input 3 is connected to the two back contacts of a push button switch P through the unilateral elements, or diodes, $d_1$ and $d_2$. On the one hand said push button switch P is in series with a resistor $R_1$ connected to zero potential 0V, and one the other hand in series with a parallel connection of a capacitor C and a relatively large resistor $R_2$ connected to a —6V, which is 6 volts negative relative to 0V. Further, point A between the one back contact of the push button switch P and the one terminal of said resistor $R_1$ is connected to a second input 2 of said second gate circuit $G_2$ through a transistor $EF_2$ connected as an emitter follower. The output of the gate circuit $G_1$ is directly (FIG. 3) or through a counter 36 (FIG. 1) connected to a second input $S_2$ of trigger FF.

The pulses produced by the generator 22 are negative pulses so that at the trailing edge of each pulse, the voltage is positive-going. Gates $G_1$ and $G_2$ are negative "and"-gates, in that when all inputs of a gate are negative (—6V), the output of the gate is similarly negative. The trigger circuit FF, in its "inoperative" condition, delivers a high voltage (nominally zero) at its output $0_1$ and a low voltage (—6V) at its output $0_2$. Trigger FF is bistable. It is switched to its "operative" condition by a sufficiently strong positive-going signal applied to its input $S_1$, and switched back to its inoperative condition by a sufficiently strong positive-going signal at its second input $S_2$.

The operation of the device described above will be explained herebelow whereby use is made of the curves shown in FIG. 2. The curve a shows the uniform pulses continuously produced by said pulse generator. After the push button of the switch P is depressed at the instant I, rather immediately thereupon point A (FIG. 1) is brought to a potential of —6V through the capacitor C. The potential of point A as a function of the time is represented in FIG. 2 by the curve b. Due to the bouncing of the movable contact on the back contacts, the potential of point A is irregular, as shown at 24 in FIG. 2, directly after I. After said potential of —6V is obtained, capacitor C is charged in the following circuit: 0V, resistor $R_1$, closed switch P, capacitor C and —6V. The rate of charge is determined by the time constant $R_1R_2C/(R_1+R_2)$ (FIG. 1) which is chosen in such a manner that the pulse repetition time T is small compared with said time constant. This is necessary because it must be certain that the trigger FF is switched to its operative condition by the first complete pulse which follows on the moment at which the push button switch is depressed, which is only possible if input 2 of said gate circuit $G_2$ is still in its conductive condition. Said gate circuit $G_2$ is dimensioned in such manner that if a voltage of about −6V is simultaneously applied to all its inputs 1, 2 and 3 a negative output signal is applied to said first input $S_1$ of trigger FF. In the inoperative condition of said trigger, that is to say, in the condition in which there are no pulses at the output of gate circuit $G_1$, said first output $\theta_1$ has a potential of 0V, while said second output $\theta_2$ has a potential of about −6V. In a similar manner first gate circuit $G_1$ is dimensioned such that an output signal of about −6V is produced, only if two inputs 1 and 2 have simultaneously a negative potential of about −6V.

From the above it will be clear that immediately after the instant I at which the push button switch P was depressed, inputs 2 and 3 of said gate circuit $G_2$ have a potential of about −6V. Consequently a negative pulse from the generator 22 will produce a pulse at the output of gate circuit $G_2$; in response to said output, pulse trigger FF is switched from said inoperative to said operative condition.

Trigger FF is dimensioned in such a manner that switching only occurs in response to the positive-going, trailing edge 25 (FIG. 2) of a pulse which, with a prescribed minimum duration, is applied to input $S_1$. This is indispensable in order to prevent, as will be further explained herebelow, that at the output of "and"-gate $G_1$ pulses are produced the duration of which is shorter than the desired value, for it may happen that the moment I is located within the time that a generator pulse is present. Because of the fact that, as appears from the above, directly after the moment I each one of said inputs 2 and 3 of gate $G_2$ have a potential of −6V, a potential of −6V at input 1 of said gate due to the presence of the generator pulse will produce a pulse at the input $S_1$ of trigger FF. If said trigger would be switched regardless of the duration of a pulse applied to input $S_1$ then in the case described above gate $G_1$ would only pass a portion of the generator pulse which is present at the time I. In different terms, the pulse produced at the output of gate $G_1$ would be "too short." By ensuring that trigger FF is switched only when a pulse applied to the input $S_1$ has a duration which equals at least the duration of a generator pulse, the risk mentioned above is excluded.

As a result of the switching of trigger FF to its operative condition, the potential of output $\theta_1$ or input 2 of gate $G_1$ is brought to a value of −6V, while a potential of 0V will be supplied to output $\theta_2$ or input 3 of gate $G_2$. Therefore, the gate circuit $G_1$ will pass a pulse from the generator, while said generator pulse cannot pass the gate $G_2$. Now said gate $G_1$ passes pulses from the generator until a counter 26, which is provided between the output of gate circuit $G_1$ and the input $S_2$ of trigger FF, has counted the prescribed number of pulses, whereupon said counter will apply a pulse to said input $S_2$. In response to the positive-going trailing edge of said pulse, said trigger FF is switched into the inoperative condition, so that gate circuit $G_1$ is closed through its input 2, while input 3 of gate circuit $G_2$ is brought to −6V.

However, it is necessary that gate circuit $G_2$, after the appearance of the trailing edge of the last pulse of said prescribed number of pulses, remain closed. To this end directly after said switching into the operative condition of said trigger, capacitor C was directly charged in a circuit from output $\theta_2$, through transistor $EF_1$, through two unilateral elements $d_1$ and $d_2$, through capacitor C and to potential source −6V. Because the output impedance of the emitter follower is low ohmic, capacitor C is charged at a "high" rate shown at 28 in FIG. 2, to be certain that upon the appearance of the leading edge of the last pulse of the prescribed number, the potential of point A is 0V. In different terms gate circuit $G_2$ is closed through its input 2.

The operation of FIG. 3 is represented in FIG. 2 by the curves $b$ and $c$. There only one pulse is to be produced at the output of gate $G_1$ after depression of switch P; to this end said output of gate circuit $G_1$ in FIG. 3 is directly coupled to said second input $S_2$ of trigger FF. As appears from said curves $b$ and $c$ in FIG. 2 the positive-going trailing edge of the next complete generator pulse appearing after the moment I, switches trigger FF into its operative condition, whereby the potential at the point B (curve $c$) increases from −6V to 0V, while the "low" rate 30 (curve $b$) of charging of capacitor C is changed into said "high" rate 28. Consequently upon the appearance of the second pulse following the instant I, point A has a voltage 0V, so that it is ensured that $G_2$ remains closed after trigger FF, in response to the trailing edge of the output pulse 34 (curve $d$) applied to input $S_2$, has been returned to its inoperative condition. In different terms, only during the time that trigger FF is in its operative condition an output pulse will be produced, which action is shown in FIG. 2 by the curves $c$ and $d$. II represents the moment at which switch P is operated again.

The output of the emitter follower $EF_1$ is connected through diodes $d_1$ and $d_2$ to both sides of said push button switch P, in order to ensure that "bouncing" of the movable contact of said push button switch will not distort said "high" rate 28 of charging. As soon as said push button is again released, capacitor C will discharge through resistor $R_2$ which is relatively large compared with the resistor $R_1$. After the discharge of capacitor C the device is ready for a new start whereby another series of pulses (FIG. 1) can be produced in response to another depression (the instant II) of push button P.

I claim:
1. In combination in a control system for gating pulses,
    (a) a pulse generator for generating a series of pulses, each beginning with a swing in the direction of one polarity and ending with a swing in the direction of the opposite polarity,
    (b) a bistable flip-flop operable to "on" and "off" states alternately, said flip-flop having an "on" input drivable by a swing of an input signal toward said opposite polarity for operating said flip-flop to said "on" state, and a separate "off" input drivable by a swing of an input signal toward said opposite polarity for operating said flip-flop to said "off" condition, said flip-flop being so constructed and dimensioned that it is operable as aforesaid only in response to swings of input signals toward said opposite direction,
    (c) a first gate connected between said generator and said "on" input of said flip-flop,
    (d) a control signal means for applying a control signal to said first gate for enabling it for passing a pulse to said "on" input of said flip-flop, whereby the trailing swing of said pulse during the enabled condition of said first gate operates said flip-flop to its "on" state,
    (e) a second gate connected to the output of said generator,
    (f) a counter connected between the output of said second gate and said "off" input of said flip-flop,
    (g) means connecting an output of said flip-flop to said second gate for turning said second gate "on" during the "on" state of said flip-flop, whereby the trailing swing of a pulse from said generator passed by said second gate operates said flip-flop to its "off" state,
    (h) whereby said flip-flop is operated for turning said first gate "on" and "off" only upon the occurrence of the trailing swings of pulses from said generator, so that said second gate passes only complete pulses.

2. In combination in a control system for gating pulses,
(a) a pulse generator for generating a series of electric pulses, each beginning with a swing toward one polarity and ending with a swing toward the opposite polarity,
(b) a bistable flip-flop operable to "on" and "off" states alternately, said flip-flop having an "on" input drivable by a swing of an input signal toward said opposite polarity for operating said flip-flop to said "on" state, and a separate "off" input drivable by a swing of an input signal toward said opposite polarity for operating said flip-flop to said "off" condition, said flip-flop being so constructed and dimensioned that it is operable as aforesaid only in response to swings of input signals toward said opposite polarity,
(c) a first gate connected between said generator and said "on" input of said flip-flop,
(d) a control signal means for applying a control signal to said first gate for enabling it for passing a pulse to said "on" input of said flip-flop, whereby the trailing swing of said pulse during the enabled condition of said first gate operates said flip-flop to its "on" state,
(e) said control signal means including a condenser for stabilizing said control signal, and including also electric circuit means providing a current path for altering the charge on said condenser, said path having sufficient electric resistance that the time constant of said condenser and said path is long compared to the time interval between successive pulses from said pulse generator,
(f) a second gate connected between the output of said generator and said "off" input of said flip-flop for passing pulses to said "off" input,
(g) means connecting an output of said flip-flop to said second gate for turning said second gate "on" during the "on" state of said flip-flop, whereby the trailing swing of a pulse from said generator passed by said second gate operates said flip-flop to its "off" state,
(h) whereby said flip-flop is operated for turning said first gate "on" and "off" only upon the occurrence of the trailing swings of pulses from said generator, so that said second gate passes only complete pulses.

3. In combination
(a) a trigger having "off" and "on" conditions, and having an "on" input drivable for operating it to said "on" condition,
(b) means responsive to an "on" condition of said trigger for operating it to "off,"
(c) a source of recurring pulses,
(d) a control circuit for said trigger connected to said source of recurring pulses, and comprising an "and"-gate for passing pulses from said source to said "on" input of said trigger for operating said trigger to "on,"
(e) means passing an enable signal from an output of said trigger when in its "off" condition to one input of said gate,
(f) circuit means including a control point and a resistor,
(g) means for applying the potential of said control point to a second input of said gate,
(h) said circuit means including a resistor connecting said control point to a disabling potential for said gate,
(i) a condenser normally having one terminal at an enabling potential for said gate, and
(j) a switch for connecting said control point to said one terminal of said condenser for thereby passing the potential of said condenser terminal as an enable signal to said gate,
(k) said resistor being included in the circuit connections to said condenser when said switch is closed,
(l) said condenser, said resistor, and the circuit connections therefor being of such value that the time constant of the change of voltage at said load point is long and,
(m) means responsive to an "on" condition of said trigger for altering the charge on said condenser toward a disabling potential with a short time constant for promptly applying a disabling voltage through said load point to said second input of said gate.

4. A device according to claim 3 wherein said trigger has an "off" input drivable for operating said trigger to said "off" condition, wherein the means responsive to the "on" condition of said trigger for turning it to "off" includes (1) a gate responsive to said "on" condition for passing pulses from said generator, and (2) a counter connected to receive pulses so passed and upon a predetermined count, to deliver a pulse to said "off" input of said trigger.

5. In combination in an electronic control,
(a) a bistable trigger having:
(1) "on" and "off" conditions,
(2) an "on" input drivable for operating said trigger to said "on" condition, and
(3) an "off" input drivable for operating said trigger to said "off" condition,
(b) a source of recurring pulses,
(c) a first gate connected to said source of recurring pulses, and responsive to an "on" condition of said trigger for passing said pulses,
(d) means directing a pulse so passed to said "off" input of said trigger,
(e) a second gate for passing pulses from said source to the "on" input of said trigger, said second gate having a pulse input, a second input, and a third input,
(f) a condenser for stabilizing said second input of said second gate,
(g) means responsive to the "on" condition of said trigger for establishing on said condenser a charge constituting an "off" signal for said second input of said second gate,
(h) means providing a resistance path for altering said charge on said condenser with a time constant that is long compared to the interval between successive ones of said recurring pulses, for establishing on said condenser a charge condition constituting an "on" signal for said second input of said second gate,
(i) means connecting an output of said trigger to said third input of said second gate for providing an "on" signal thereto when said trigger is in said "off" condition, and
(j) means including a switch for connecting said condenser to said second input of said second gate,
(k) said second gate being responsive to the simultaneous occurrence of "on" signals at said second and third inputs thereof for passing a pulse to said "on" input of said trigger.

6. The combination of claim 5 wherein there is included a counter, wherein said trigger has an "off" input drivable for operating said trigger to said "off" condition, wherein pulses passed by said first gate actuate said counter, and wherein said counter delivers a pulse to said "off" input of said trigger.

References Cited by the Examiner
UNITED STATES PATENTS 2,912,585 11/1959 Sullivan et al. _____ 328—41
3,151,252 9/1964 Leightner _____ 307—88.5

ARTHUR GAUSS, *Primary Examiner.*

DAVID J. GALVIN, JOHN W. HUCKERT, *Examiners.*